(12) United States Patent
Kim et al.

(10) Patent No.: US 7,442,738 B2
(45) Date of Patent: Oct. 28, 2008

(54) BARRIER RIB FORMATION COMPOSITION FOR MANUFACTURING PLASMA DISPLAY PANEL

(75) Inventors: Jin Seok Kim, Inchun-si (KR); Jae Ho Choi, Kyoungki-do (KR); Geun Soo Lee, Seoul (KR); Buung Cheol Kim, Kyoungki-do (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 11/185,826

(22) Filed: Jul. 21, 2005

(65) Prior Publication Data

US 2006/0020050 A1    Jan. 26, 2006

(30) Foreign Application Priority Data

Jul. 22, 2004    (KR) .................. 10-2004-0057409

(51) Int. Cl.
*C08K 3/18*    (2006.01)

(52) U.S. Cl. ...................................... 524/430

(58) Field of Classification Search ................. 524/430
See application file for complete search history.

(56) References Cited

U.S. PATENT DOCUMENTS 6,074,893 A * 6/2000 Nakata et al. ............... 438/106

6,783,828 B2 * 8/2004 Fujimaru et al. ........... 428/40.1

FOREIGN PATENT DOCUMENTS

| EP | 0 722 179 A3 | 7/1996 |
| EP | 1 221 431 A1 | 7/2002 |
| JP | 2002-274884 A | 9/2002 |
| JP | 2003-020251 A | 1/2003 |
| KR | 1020000060891 A | 10/2000 |
| WO | WO-03/102997 A1 | 12/2003 |

OTHER PUBLICATIONS

Hawley's Condensed Chemical Dictionary, 14th Ed., 2002.*

* cited by examiner

*Primary Examiner*—Bernard Lipman
(74) *Attorney, Agent, or Firm*—Birch, Stewart, Kolasch & Birch, LLP

(57) ABSTRACT

Disclosed is a barrier rib forming composition for manufacturing a plasma display panel which is capable of hydrogen bonding, and contains a mixed solvent including a second solvent with a high boiling point and a low vapor pressure to enable rapid formation of barrier ribs. The barrier rib forming composition for manufacturing a plasma display panel comprises: 500 g of ceramic powder, 50 to 70 g of acryl resin, 15 to 25 g of plasticizer and 100 to 140 g of a mixed solvent of a second solvent, capable of hydrogen bonding and having a high boiling point and a low vapor pressure, and toluene.

2 Claims, 1 Drawing Sheet

BARRIER RIB FORMATION COMPOSITION FOR MANUFACTURING PLASMA DISPLAY PANEL

BACKGROUND OF THE INVENTION

1) Field of the Invention

The present invention relates to a barrier rib formation or forming composition for manufacturing a plasma display panel. More particularly, the present invention relates to a barrier rib forming composition for manufacturing a plasma display panel which is capable of hydrogen bonding, and contains a mixed solvent including a second solvent with a high boiling point and a low vapor pressure to enable rapid formation of barrier ribs.

2) Description of the Related Art

With the advent of the new century, plasma display panels (referred to as "PDPs") have been standing at the forefront of the large-sized display market.

The PDP is representative of a flat display device along with a field emission display (FED) and a liquid crystal display (LCD), and has merits that in that it has a simple structure that makes it easier to manufacture, an excellent light efficiency including high brightness and high light emission, a memory function and a wide viewing angle of greater than 160°, and can display a large screen of more than 40 inches.

Generally, a PDP has the construction as shown in FIG. 1.

That is, the PDP comprises: a rear substrate 1 having an address electrode 11 mounted thereon; a lower dielectric layer 12 coated on top of the rear substrate 1 at a predetermined thickness to form a wall charge; barrier ribs 3 formed on top of the lower dielectric layer 12 to separate each discharge cell; a fluorescent material 4 excited with light generated by plasma discharge to emit light; transparent sustain electrodes 21 formed on the bottom of a front substrate 2; an upper dielectric layer 22 coated on the bottom of the front substrate 2 at a predetermined thickness to form a wall charge; and a protective layer 23 coated on the bottom of the dielectric layer 22 to protect the upper dielectric layer 22 from sputtering by discharge. In the PDP thus-constructed, when a predetermined driving voltage (e.g., of 200V) is applied to the address electrode 11 and the sustain electrode 21, plasma discharge occurs in the discharge cell by electrons emitted from the address electrode 11. More concretely, electrons emitted from the electrode causes a second electron emission while ionizing the atoms in the gas selected from the group consisting of helium (He), neon (Ne), argon (Ar) or a mixture thereof sealed in the discharge cell by friction with the atoms of the gas. The second electrons sequentially ionize the atoms while repeating the friction with pseudo atoms. That is, this leads to a state of electron amplification, at which electrons and ions are doubled, i.e., a so-called avalanche state. The light generated in this procedure excites the fluorescent material 4 put into the discharge cell, and the molecules of the fluorescent material 4 in an excited state are transited to a ground state again to emit light of three primary colors of red (hereinafter, "R"), green (hereinafter, "G") and blue (hereinafter, "B") according to the type of fluorescent material. This light of R, G or B proceeds to the front substrate 2 made of glass via the protective layer 23, the upper dielectric layer 22 and the transparent sustain electrode 21 to display characters or graphics. Meanwhile, the barrier ribs 3 are formed in a stripe shape or the like to separate each discharge cell and reflect the light emitted from the fluorescent material 4 toward the front substrate 2.

Therefore, in the manufacture of a PDP, the formation of barrier ribs is a very important process, and in order to apply the PDP to a high picture quality display apparatus, barrier ribs are made higher in definition, and a high aspect ratio is required.

As shown in FIG. 2, several methods of forming barrier ribs have been developed and used.

First, the methods are roughly divided into a paste application method and a green sheet application method.

The paste application method is classified into a technique of forming barrier ribs by a sanding method after applying a barrier rib forming paste to a rear substrate of glass by screen printing or table printing and drying it and a technique of forming barrier ribs by a chemical etching method after applying a barrier rib forming paste on a rear substrate of glass by table printing and drying it. However, the paste application method has a technical difficulty in that the larger the screen is, the more difficult it is to uniformly apply the paste. Non-uniform application of the paste results in the formation of non-uniform discharge cells by the formation of non-uniform barrier ribs, which ultimately provides a non-uniform screen. Further, the sanding method has a demerit that it is impossible to form barrier ribs of various shapes.

The green sheet application method is a technique of forming barrier ribs by a sanding method or chemical etching method after firstly molding a paste into a green sheet having a predetermined width, thickness and length by using a thick film coater properly constructed, transferring the green sheet and sintering it. Such a technique of using a green sheet is a technique suitable for the manufacture of a PDP, a large-sized display, and allows the PDP to have a uniform thickness because the green sheet is formed first and thus results in the formation of uniform discharge cells by the formation of uniform barrier ribs, which ultimately provides a uniform screen.

One of the many difficulties in the technique of using a green sheet is the problem of sintering. That is, a large amount of air bubbles may be generated in a green sheet plastic body during sintering in the procedure of forming barrier ribs by a sanding method or chemical etching method after transferring the green sheet on the lower dielectric layer 12 of the rear substrate 1 and sintering it in order to increase the speed of production of barrier ribs. These air bubbles have a size ranging from several microns (μm) to several hundreds of microns (μm), and if these air bubbles are present in the portions where barrier ribs should remain after sanding or etching, which is the process of forming barrier ribs, barrier ribs cannot be formed. The non-formation of barrier ribs leads to the non-formation of discharge cells, which are the base of pixels, to cause defective pixels and poor picture quality. Whether air bubbles are formed or not during sintering are dependent upon the composition and physical properties of a barrier rib forming paste.

SUMMARY OF THE INVENTION

It is an object of the present invention to provide a barrier rib formation or forming composition for manufacturing a plasma display panel which is capable of hydrogen bonding, and contains a mixed solvent including a second solvent with a high boiling point and a low vapor pressure to enable rapid formation of barrier ribs.

The barrier rib forming composition for manufacturing a plasma display panel according to the present invention comprises: 500 g of ceramic powder, 50 to 70 g of acryl resin, 15 to 25 g of plasticizer and 100 to 140 g of a mixed solvent of a second solvent, capable of hydrogen bonding and having a high boiling point and a low vapor pressure, and toluene.

The second solvent may be preferably selected from the group consisting of ethylene glycol ethers, such as ethylene glycol monomethyl ether, ethylene glycol monoethyl ether, ethylene glycol monopropylene ether, ethylene glycol monobutyl ether, ethylene glycol monopentyle ether, ethylene glycol monohexyl ether, ethylene glycol mono-2-ethyl hexyl ether, ethylene glycol dimethyl ether, ethylene glycol diethyl ether, ethylene glycol dipropylene ether, ethylene glycol dibutyl ether, ethylene glycol dipentyl ether, ethylene glycol dihexyl ether and ethylene glycol di-2-ethyl hexyl ether; propylene glycol ethers, such as propylene glycol monomethyl ether, propylene glycol monoethyl ether, propylene glycol monopropylene ether, propylene glycol monobutyl ether, propylene glycol monopentyle ether, propylene glycol monohexyl ether, propylene glycol mono-2-ethyl hexyl ether, propylene glycol dimethyl ether, propylene glycol diethyl ether, propylene glycol dipropylene ether, propylene glycol dibutyl ether, propylene glycol dipentyl ether, propylene glycol dihexyl ether and propylene glycol di-2-ethyl hexyl ether; or a mixture of two or more of them.

The mixed solvent is formed by mixing 40 to 60% by weight of the second solvent and the toluene as a residual quantity.

Therefore, according to the present invention, there is provided a barrier rib forming composition for manufacturing a plasma display panel which is capable of hydrogen bonding, and contains a mixed solvent including a second solvent with a high boiling point and a low vapor pressure to enable rapid formation of barrier ribs, and accordingly rapid sintering of a green sheet is enabled and air bubbles are prevented from forming, thereby rapidly manufacturing barrier ribs of superior quality.

DETAILED DESCRIPTION OF THE INVENTION

Figure 1:
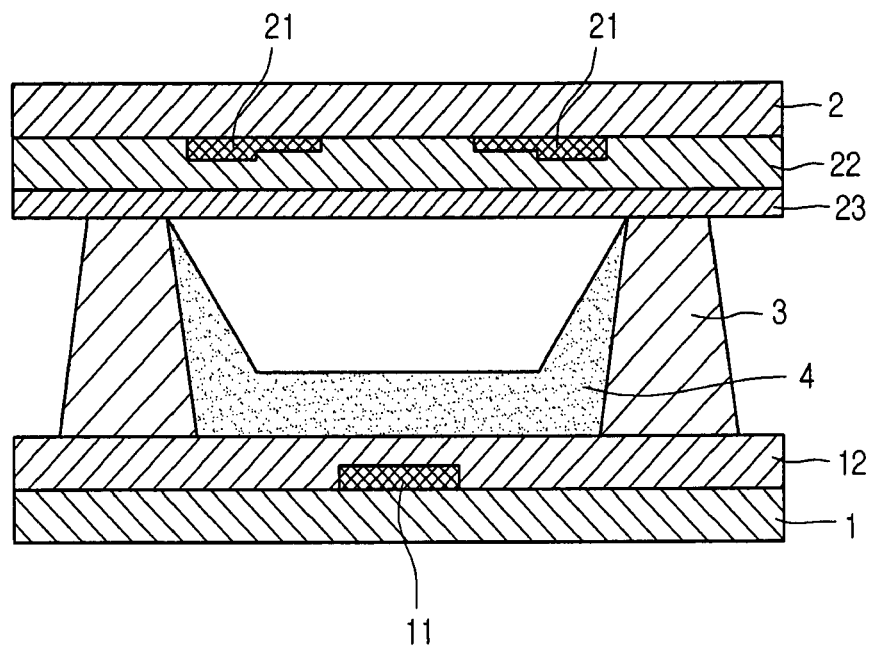
FIG. 1 is a block diagram schematically showing the construction of a plasma display panel.
Figure 2:
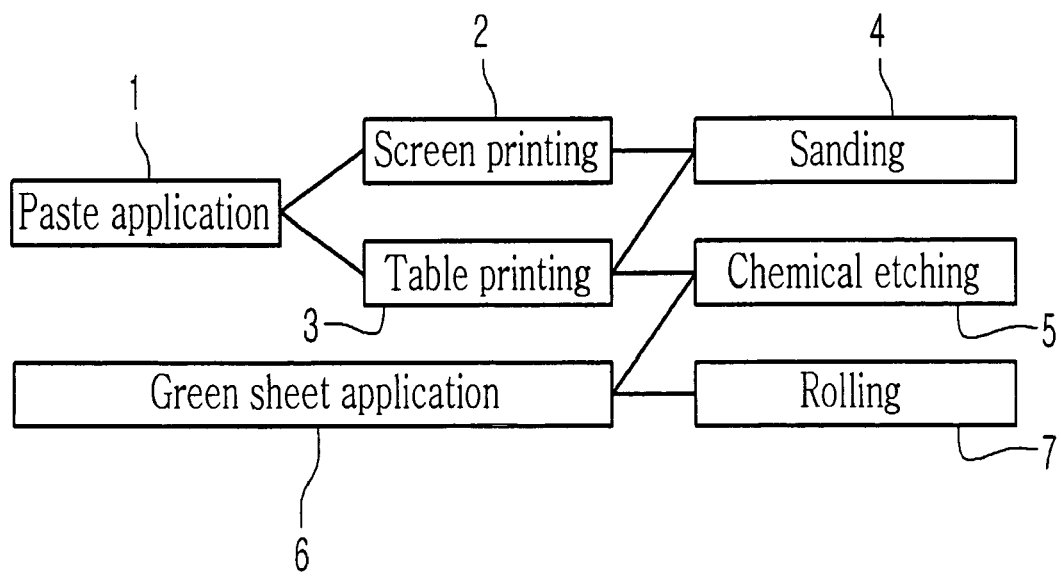
FIG. 2 is a view schematically showing a method of forming barrier ribs for forming separate discharge spaces filled with fluorescent materials of three primary colors.

Generally, the barrier rib forming paste is composed of a ceramic powder remaining after sintering and etching and forming barrier ribs, a resin for maintaining the paste to be a film having a given thickness right before sintering after application, and a solvent for making the ceramic powder and resin applicable by maintaining them in a paste state. A plasticizer or the like is added thereto to prepare a barrier rib forming paste with proper physical properties. A conventional barrier rib paste comprises 500 g of ceramic powder, 50 to 70 g of acryl resin, 15 to 25 g of plasticizer and 100 to 140 g of toluene acting as a solvent. Here, one half of the toluene acting as the solvent is used as a dispersion solvent for dispersing the acryl resin and the other half is used as a solvent for maintaining the entire composition in a slurry state. Examples of molding such a barrier rib forming paste into a green sheet and using it for the formation of barrier ribs are shown in a multiplicity of patent applications and the like including Korean Laid-Open Patent Publication No. 2000-60891, and it may be understood that they are known to an extent you can purchase and use the ones commercially provided by domestic and foreign leading manufacturers. However, toluene exhibits a characteristic that it evaporates quickly upon a rapid temperature increase applied during the sintering of the green sheet because, though toluene has a high boiling point, it is a solvent having a high vapor pressure and incapable of hydrogen bonding, and accordingly, there is a problem that air bubbles are formed in the green sheet plastic body.

In the meanwhile, The new barrier rib forming composition for manufacturing a plasma display panel according to the present invention comprises: 500 g of ceramic powder, 50 to 70 g of acryl resin, 15 to 25 g of plasticizer and 100 to 140 g of a mixed solvent of a second solvent, capable of hydrogen bonding and having a high boiling point and a low vapor pressure, and toluene. That is, the present invention is characterized in that: a green sheet is formed from the barrier rib forming composition by using, as a solvent used for the manufacture of the barrier rib forming composition for manufacturing the plasma display panel in a slurry state, a mixed solvent of a second solvent capable of hydrogen bonding and having the characteristics of high boiling point and low vapor pressure and toluene, and in case of sintering, air bubbles are basically prevented from forming in a green sheet plastic body even if the green sheet is quickly sintered, whereby barrier ribs are not lost but uniformly formed even when the barrier ribs are formed by etching. The second solvent may be preferably selected from the group consisting of ethylene glycol ethers, such as ethylene glycol monomethyl ether, ethylene glycol monoethyl ether, ethylene glycol monopropylene ether, ethylene glycol monobutyl ether, ethylene glycol monopentyle ether, ethylene glycol monohexyl ether, ethylene glycol mono-2-ethyl hexyl ether, ethylene glycol dimethyl ether, ethylene glycol diethyl ether, ethylene glycol dipropylene ether, ethylene glycol dibutyl ether, ethylene glycol dipentyl ether, ethylene glycol dihexyl ether and ethylene glycol di-2-ethyl hexyl ether; propylene glycol ethers, such as propylene glycol monomethyl ether, propylene glycol monoethyl ether, propylene glycol monopropylene ether, propylene glycol monobutyl ether, propylene glycol monopentyle ether, propylene glycol monohexyl ether, propylene glycol mono-2-ethyl hexyl ether, propylene glycol dimethyl ether, propylene glycol diethyl ether, propylene glycol dipropylene ether, propylene glycol dibutyl ether, propylene glycol dipentyl ether, propylene glycol dihexyl ether and propylene glycol di-2-ethyl hexyl ether; or a mixture of two or more of them.

Preferably, the mixed solvent is formed by mixing 40 to 60% by weight of the second solvent and the toluene as a residual quantity. In a case where the second solvent contained in the entire mixed solvent is less than 40% by weight, the content of toluene is relatively higher due to the shortage of the second solvent to enable hydrogen bonding by the use of the second solvent according to the present invention, and decrease the effects of high boiling point and low vapor pressure. Thus, in case of quick sintering at a high temperature, there may be a problem that air bubbles are formed in a green sheet plastic body. On the contrary, in a case where the second solvent contained in the entire mixed solvent is greater than 60% by weight, there may be a problem that the slurry properties of the barrier rib forming composition for manufacturing a plasma display panel are deteriorated.

Hereinafter, a preferred example of the present invention and comparative examples will be described.

In addition, the following examples are for illustration only, not intended to limit the scope of this disclosure.

EXAMPLE

A barrier rib forming composition for manufacturing a plasma display panel according to the present invention, comprising 500 g of ceramic powder, 60 g of acryl resin, 20 g of a plasticizer, and a solvent of 60 g of propylene glycol monomethyl ether acting as a second solvent and 60 g of toluene, was obtained by firstly mixing the toluene with the acryl resin for dispersion of the acryl resin and then mixing the ceramic powder, slurries of the acryl resin, the plasticizer and the propylene glycol monomethyl ether.

Comparative Example

A barrier rib forming composition for manufacturing a plasma display panel according to the present invention was obtained in the same manner as the example but using toluene wholly as a solvent, rather than propylene glycol monomethyl ether acting as a second solvent.

Experimental Example

A green sheet with a size of 1 m×1 m and a thickness of 300 µm was molded from the compositions of the example and comparative example by using a commercialized thick film coater, dried, and sintered. The green sheet was sintered at different heat increase rates and peak temperatures of sintering, and it was observed how many air bubbles were generated in a green sheet plastic body obtained by the sintering. The result is shown in Table 1.

TABLE 1

| Temperature increase rate (° C./min) | Number (ea) of air bubbles in green sheet plastic body | | | |
|---|---|---|---|---|
| | Peak temperature of 100° C. | | Peak temperature of 160° C. | |
| | Example | Comparative Example | Example | Comparative Example |
| 10 | 0 | 0 | 0 | many |
| 20 | 0 | many | 0 | many |
| 30 | 0 | many | 0 | many |

In Table 1, the term "many" means that at least 30 air bubbles were formed. In the manufacture of a PDP, many air bubbles usually lead to the formation of defective barrier ribs. The formation of defective barrier ribs leads to defective pixels. Thus, it is most preferable to eliminate air bubbles completely if possible, and it is preferable that as small an amount of air bubbles are formed as possible in an actual manufacture process. The higher the heat increase rate is, the faster the sintering process is done, which is a decisive factor in improving the productivity. In the sintering process, sintering is done in the procedure of conveying the green sheet along a belt while passing through a sintering furnace. Thus, because sintering is possible without generating air bubbles at a fast heat increase rate and a high peak temperature, the sintering can be completed at a high speed without a defect, resultantly sharply increasing the productivity.

As a result of putting together the above examples, in a case where a green sheet is molded by using the barrier rib forming composition for manufacturing a plasma display panel according to the present invention and a PDP is manufactured by using the green sheet, because sintering is possible without generating air bubbles at a fast heat increase rate and a high peak temperature, the sintering can be completed at a high speed without a defect, resultantly sharply increasing the productivity.

Therefore, according to the present invention, there is provided a barrier rib forming composition for manufacturing a plasma display panel which is capable of hydrogen bonding, and contains a mixed solvent including a second solvent with a high boiling point and a low vapor pressure to enable rapid formation of barrier ribs, and accordingly rapid sintering of a green sheet is enabled and air bubbles are prevented from forming, thereby rapidly manufacturing barrier ribs of superior quality.

Although the invention has been shown and described in the specific example, many variations and modifications may be made within this invention as will be apparent to those skilled in the art. Such changes and modifications are within the scope and teaching of this invention as defined in the claims appended hereto.

What is claimed is:

1. A barrier rib forming composition for a plasma display panel, comprising:
    a ceramic powder, an acrylic resin, a plasticizer and a mixed solvent,
    wherein the mixed solvent includes a toluene as a first solvent and a second solvent capable of hydrogen bonding, and
    wherein the second solvent is at least one member selected from the group consisting of ethylene glycol ethers, such as ethylene glycol monomethyl ether, ethylene glycol monoethyl ether, ethylene glycol monopropylene ether, ethylene glycol monobutyl ether, ethylene glycol monopentyl ether, ethylene glycol monohexyl ether, ethylene glycol mono-2-ethyl hexyl ether, ethylene glycol dimethyl ether, ethylene glycol diethyl ether, ethylene glycol dipropylene ether, ethylene glycol dibutyl ether, ethylene glycol dipentyl ether, ethylene glycol dihexyl ether and ethylene glycol di-2-ethyl hexyl ether; propylene glycol ethers, such as propylene glycol monomethyl ether, propylene glycol monoethyl ether, propylene glycol monopropylene ether, propylene glycol monobutyl ether, propylene glycol monopentyl ether, propylene glycol monohexyl ether, propylene glycol mono-2-ethyl hexyl ether, propylene glycol dimethyl ether, propylene glycol diethyl ether, propylene glycol dipropylene ether, propylene glycol dibutyl ether, propylene glycol dipentyl ether, propylene glycol dihexyl ether and propylene glycol di-2-ethyl hexyl ether.

2. The barrier rib forming composition of claim 1, wherein the mixed solvent contains 40 to 60% by weight of the second solvent with the balance being toluene.

* * * * *